Sept. 22, 1964  J. V. BAUM  3,149,829
SELF-DAMPING SUSPENSION UNIT
Filed Nov. 16, 1962
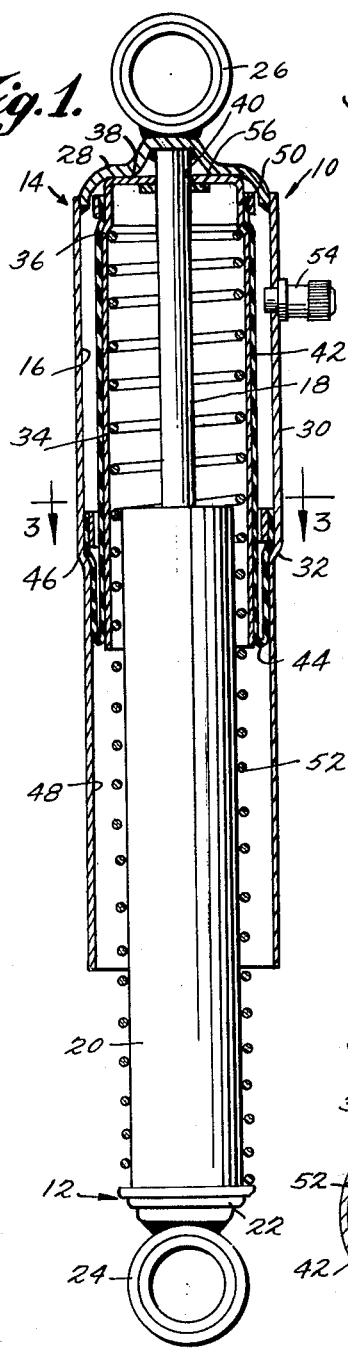
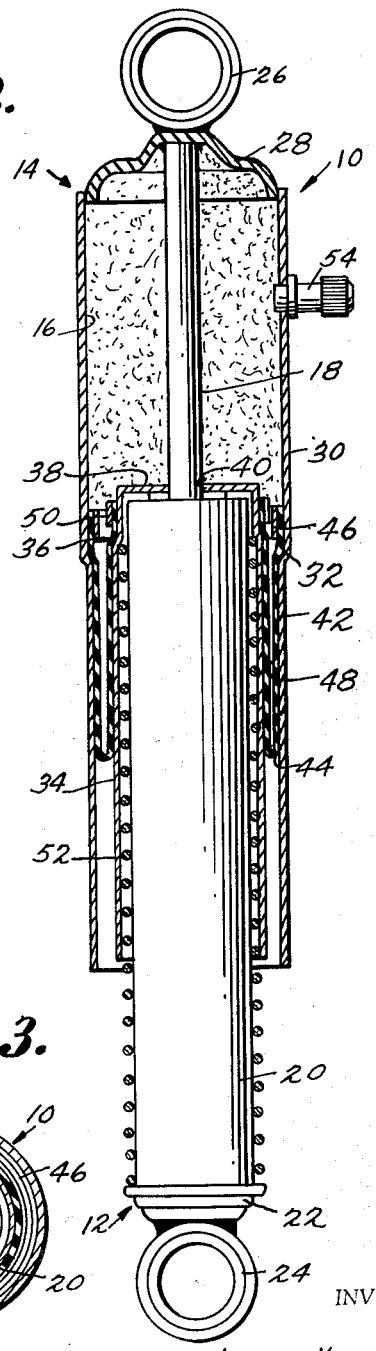
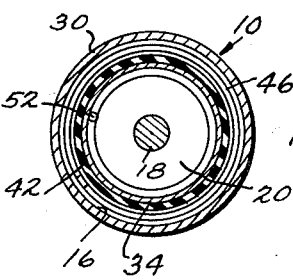
INVENTOR
JOSEPH VERNON BAUM
BY Cushman, Darby & Cushman
ATTORNEYS

United States Patent Office 3,149,829
Patented Sept. 22, 1964

3,149,829
SELF-DAMPING SUSPENSION UNIT
Joseph Vernon Baum, Columbus, Ohio, assignor, by mesne assignments, to Maremont Corporation, Chicago, Ill., a corporation of Illinois
Filed Nov. 16, 1962, Ser. No. 238,200
6 Claims. (Cl. 267—34)

This invention relates to vehicle suspensions and more particularly to load supporting damper units of the type disclosed in the commonly assigned application to Broadwell, Serial No. 190,106, filed April 25, 1962.

A unit of the type disclosed in the Broadwell application consists essentially of a conventional piston and cylinder type shock absorber and an outer tubular part or member connected with the outwardly extending end of the piston rod of the shock absorber and disposed in surrounding relation with the cylinder of the shock absorber. A folded rolling seal is provided between the outer tubular member and the outer tubular member of the shock absorber so as to define therewith an air chamber capable of supporting a portion of the load of the sprung mass of the vehicle on the unsprung mass thereof.

While the above-mentioned folded rolling seal has proven to be quite effective in operation, some problems have arisen where units of this type have been stored for a period of time prior to use. In operation, the folded rolling seal is adapted to engage between spaced annular surfaces, the outer fold of the seal engaging an interior annular surface and the inner fold of the seal engaging an inwardly spaced exterior annular surface. Normally, the seal is constructed in sleeve or tubular form having a constant diameter, this diameter being intermediate the diameters of the exterior and interior fold engaging surfaces. In operation, the outer fold of the sleeve seal will therefore be in tension having expanded from its normal intermediate diameter to the larger diameter of the outer interior surface. Conversely, the inner fold of the seal will be in compression having decreased in diameter from its normal diameter to the smaller diameter of the inner exterior annular surface.

Where a unit of this type is stored for a period of time under some air pressure without being used, there is a tendency for the folded portions of the sleeve to assume a permanent set condition in their expanded or contracted position, as the case may be. After such a condition has taken place in the sleeve seal and the unit is subsequently put into operation, the rolling action of the seal becomes initially more difficult due to the set condition and creases may occur in the expanded portion of the seal which ultimately develop into leaks resulting in failure of the load carrying ability of the unit.

The above condition can be substantially eliminated by exhausting the air pressure from the air chamber so that the folded portions of the seal are not fixed to assume an expanded or contracted position where a permanent set condition can take place. However, operation of the unit without pressure in the air chamber will almost invariably result in serious damage to the seal, since without pressure in the air chamber a proper rolling action is prevented causing the seal to fold on itself thus resulting in ultimate destruction. Even if a lubricant, such as silicon fluid, is added to the air chamber to alleviate such doubling action continued recycling will ultimately result in failure.

Because of the situation indicated above, a manufacturer of the units, if the units are to be shipped without air pressure in the air chamber, must rely upon the individuals responsible for installing the units on the vehicle to supply the air chamber with air pressure during installation. Experience has shown that a fair percentage of such individuals will not carry out this responsibility so that there will always be a percentage of the units manufactured which will not give satisfactory performance.

For this reason, it is preferable to ship the units with at least some pressure in the air chamber so as to relieve the individuals who will install the units of the responsibility of introducing air pressure into the air chamber before any substantial use of the unit takes place. Where the units are shipped with air pressure in the chamber, the possibility of failure because of the set condition of the seal, as previously mentioned, exists. In addition, where air pressure is contained within the air chamber, the unit will normally be urged into an expanded condition and unless some packaging device is utilized to lock the unit in its contracted position (which device adds to the cost involved) the storage space of the packaged units is substantially increased.

In addition to the installation problems noted above, there is also presented the possibility of damaging the folded rolling seal of a unit after installation if for some reason the air pressure leading to the unit is lost. For example, in many installations the air chambers of two units mounted on the vehicle are interconnected by a conduit system. A failure in the conduit system causing the pressure in the air chambers of the units to reduce to atmospheric pressure would likewise result in failure of the seals of the units if operated with the air chambers under such reduced pressure conditions.

An object of the present invention is to overcome the difficulties mentioned above. These difficulties are overcome in accordance with the present invention by providing for the relative movement of the parts of the unit which define the air chamber into an inoperative position when the air chamber is exhausted to atmosphere so that the parts of the unit between which the folded rolling seal is connected will not have any relative movement when disposed in the inoperative position in response to a relative movement between the parts of the shock absorber. In this way the unit can be shipped in a collapsed condition, thus alleviating the storage problem and if the unit is installed and operated on the vehicle prior to the introduction of air under pressure into the air chamber, no rolling movement of the seal will occur which would lead to damage and ultimate failure thereof. In addition, the present invention is such that the parts defining the air chamber will be moved from their inoperative position into an operative position in response to the introduction of air under pressure into the air chamber. When the parts are disposed in their operative position, they function in the normal manner to move relative to one another to vary the volume of the air chamber in response to the relative movement between the shock absorber parts.

Accordingly, another object of the present invention is the provision of a suspension unit of the type described in which the air chamber defining parts of the unit are movable between an inoperative position and an operative position in the manner set forth above.

Still another object of the present invention is the provision of a self-damping suspension unit of the type described having auxiliary spring means operable to effect movement of the air chamber defining parts into their inoperative position in response to the exhausting of the air chamber to atmosphere.

These and other objects of the present invention will become more apparent during the course of the following detailed description and appended claims.

The invention may best be understood with reference to the accompanying drawings wherein an illustrative embodiment is shown.

In the drawings:

FIGURE 1 is a vertical sectional view of a self-damping suspension unit embodying the principles of the present invention and showing the parts in their inoperative position;

FIGURE 2 is a view similar to FIGURE 1 showing the parts in their operative position; and FIGURE 3 is a sectional view taken along the line 3—3 of FIGURE 1.

Referring now more particularly to the drawings, there is shown therein a self-damping suspension unit or load supporting damper unit embodying the principles of the present invention, designated generally by the numeral 10. The basic components of the unit 10 include a conventional piston and cylinder type shock absorber, generally indicated at 12, and a plurality of suspension parts, generally indicated at 14, defining a load supporting air chamber 16 adjacent the upper portion of the shock absorber 12.

The shock absorber 12 may be of any suitable construction. An example of such a construction is illustrated in detail in the abovementioned Broadwell application. In the drawings the internal working parts of the shock absorber 12 are not illustrated, it being understood that the shock absorber 12 includes an interior cylinder within which a piston is slidably mounted, the piston being provided with appropriate restricted orifices to permit the passage of hydraulic fluid from the upper portion of the cylinder to the lower portion thereof. Connected with the piston and extending upwardly therefrom through one end of the cylinder is a piston rod member shown in the drawings and designated by the numeral 18.

In accordance with conventional practice, in order to compensate for the displacement of the piston rod in the upper portion of the cylinder, the opposite end of the cylinder is provided with a base valve mechanism which controls flow from the lower portion of the cylinder into an outer annular replenishing chamber formed by the exterior of the cylinder and the interior of an outer tubular member, illustrated in the drawings and designated by the numeral 20. The base valve member is conventionally provided with a replenishing valve to permit fluid from the replenishing chamber to enter into the lower portion of the cylinder during rebound and a restricted valve passage permitting movement of hydraulic fluid from the lower portion of the cylinder into the replenishing chamber during the compression stroke.

It will be understood that a suitable sealing assembly is provided adjacent the upper end of the shock absorber cylinder and the outer tubular member 20 providing a slidable sealing engagement with the piston rod 18. The lower end of the outer tubular member 20 is fixedly connected with the lower end of the cylinder, as by an end closure 22, the end closure having a suitable connecting element 24 rigidly secured thereto and extending downwardly therefrom. The connecting element may be of any conventional type, as for example, a stud connector or a ring or eye type connector as shown. In a like manner, a suitable connecting element 26 is rigidly secured to the upper extremity of the piston rod 18. As shown, this element is in the form of a ring or eye type connector, the connector being rigidly secured to an end closure 28 constituting one of the suspension parts 14, which, in turn, is rigidly secured, as by welding or the like, to the upper end of the piston rod member 18.

The end closure 28 is of generally inverted dish-shaped configuration and has rigidly secured to the outer periphery thereof, as by welding or the like, the upper end of an outer tubular element 30 constituting one of the suspension parts 14. The tubular element 30 is provided with an annular shoulder 32 intermediate its end and the lower portion of the tubular element extending downwardly from the shoulder has a constant diameter less than the constant diameter of the upper portion of the tubular element extending upwardly from the shoulder.

The suspension parts 14 also include an inner tubular element 34 of a size to engage over the outer tubular member 20 of the shock absorber 12 in spaced relation and within the lower reduced diameter portion of the outer tubular element 30 in spaced relation thereto. Formed in the tubular element 34 adjacent the upper end thereof is an annular shoulder 36 and the upper extremity of the tubular element 34 extends radially inwardly to provide a portion 38 having a central aperture 40 formed therein to receive therethrough the piston rod member 18.

Mounted between the tubular element parts 30 and 34 is a folded rolling seal 42. The seal is preferably made of a suitable flexible material which has a considerable resistance to expansion or compression such as a woven sleeve of fibrous material embedded within a molded or extruded plastic or rubber material. Preferably, the sleeve is molded with a normal diameter of a size intermediate the diameter size of the lower portion of the tubular element 30 and the diameter size of the tubular element 34. The sleeve is mounted between the tubular element parts by folding the same upon itself so as to provide a fold, indicated at 44, intermediate the ends thereof which divide the sleeve into an outer folded portion and an inner folded portion.

The end of the sleeve seal 42 associated with the outer folded portion is fixedly secured to the interior surface of the outer tubular element 30 adjacent to and above the annualar shoulder 32, by an suitable means, such as a ring 46 of metal or the like suitably expanded to grip the end of the sleeve between the exterior surface thereof and the adjacent interior surface of the tubular element 30. It will be noted that the lower portion of the tubular element 30 provides and interior annular or pheripheral surface 48 for engaging the outer folded portion of the seal 42.

The end of the sleeve associated with the inner folded portion thereof is fixedly secured to the inner tubular element 34 adjacent to and above the shoulder 36 by any suitable means, such as a ring 50 of metal or the like compressed into engagement with the end of the seal so as to grip the latter between the interior surface of the ring and the adjacent exterior surface of the tubular element 34.

The inner tubular element 34 is mounted for movement from an inoperative position, such as shown in FIGURE 1, to an operative position, such as shown in FIGURE 2. The tubular element is positively moved into its inoperative position when the air chamber 16 is exhausted to atmosphere, by means of a coil spring 52 disposed in surrounding relation to the outer tubular member 20 of the shock absorber and having its lower end disposed in abutting engagement with the end closure 22 mounted on the lower end thereof. The upper end of the coil spring 52 engages the interior surface provided by the annular shoulder 36 of the inner tubular element 34.

The strength of the spring 52 is such that it will normally overcome whatever resistance is offered to the upward movement of the inner tubular element 34 when the air chamber 16 is exhausted to atmosphere. In this regard, any suitable means may be provided for controlling the introduction of air under pressure into the air chamber 16 and the exhaust of air from the chamber to atmosphere. As shown, a conventional tire valve 54 is mounted in the upper portion of the outer tubular element 30. It will be understood that the valve 54 includes a spring pressed check valve member normally preventing flow of air outwardly of the air chamber 16 which can be removed or loosened to exhaust the air in the air chamber to atmosphere. As is well known, this check valve member is such that when engaged by a conventional filling station type air hose it will be moved into open position to allow the passage of air from the air hose into the air chamber 16 and upon removal of the air hose to retain the air under pressure within the air chamber. In accordance with conventional practice, the valve 54 may be provided with a suitable cap or the like.

A significant feature of the present invention is that the inner tubular element 34 is arranged to be moved from the inoperative position shown in FIGURE 1 to the operative position shown in FIGURE 2 in response to the introduction of air under pressure into the air chamber 16. In order to effect such movement, an annular sealing element 56 is connected with the end portion 38 of the inner tubular element 34 adjacent the central interior surface thereof. The sealing element 56 slidably sealingly engages the cylindrical peripheral surface of the piston rod member 18 so as to form a substantially air-tight slidable connection therewith. In this way, introduction of air under pressure into the air chamber 16 through the valve 54 will result in a downward movement of the inner tubular element 34 until the lower surface of the sealing element 56 engages the upper end of the upper end closure of the shock absorber 12. The strength of the coil spring 52 is such that it readily yields in response to the introduction of air under pressure in the air chamber 16.

*Operation*

The unit 10 of the present invention will normally be shipped and stored in a completely collapsed condition with the check valve member of the tire valve 54 either loosened or removed to communicate the air chamber 16 to the atmosphere. In this condition, the coil spring 52 will act to effect movement of the inner tubular element 34 upwardly into the position shown in FIGURE 1 wherein the end portion 38 is disposed in substantial abutting engagement with the end closure 28. While the spring 52 would normally urge the shock absorber parts into an extended position, the strength of this spring is not sufficiently greater than that required to effect movement of the inner tubular element 34 against the resistance offered by sealing element 56 and the folded rolling seal 42. Hence, the unit can be packaged quite readily in a collapsed position and stored in such position.

When it is desired to install the unit, the connector elements 24 and 26 are connected to the appropriate points on the vehicle and it will be noted that these connector elements can be moved toward and away from each other by the normal movements of the shock absorber 12 so long as the air chamber 16 is exhausted to atmosphere. However, such movement of the shock absorber parts will not result in any relative movement between the suspension parts 14. The inner tubular element 34 is effectively secured to the outer tubular element 30 through the operation of the spring 52 so that movement of the outer tubular member 20 of the shock absorber can readily take place without effecting a corresponding relative movement between the suspension parts. In this way, if the shock absorber parts are moved prior to installation or if after installation the vehicle is operated without the introduction of air under pressure into the chamber 16, there will be no movement of the folded rolling seal 42. In this way the folded rolling seal is protected against a possible damaging movement in a collapsed condition.

After the unit has been properly connected to the vehicle parts, the check valve member is inserted within the valve 54 and air under pressure is introduced into the air chamber 16 as by a conventional filling station hose or the like. As the air pressure within the air chamber 16 is increased the inner tubular element 34 will move downwardly from the position shown in FIGURE 1 by virtue of the sealing element 56 until the latter engages the upper end closure of the shock absorber 12 as shown in FIGURE 2. In this position the inner tubular element 34 is now effectively secured to the outer tubular member 20 of the shock absorber 12 so as to move therewith in response to the movements of the latter. Consequently, in this position the air under pressure within the air chamber 16 will support a portion of the sprung mass of the vehicle on the unsprung mass thereof. It will be understood that the unit 14 when the air chamber 16 is supplied with suitable air under pressure may be utilized as an assist self-damping suspension unit in the manner indicated in Broadwell application Serial No. 190,106 previously mentioned, the disclosure of which application is hereby incorporated by reference into the present disclosure.

It should be noted that when units embodying the present invention are utilized in a system such as disclosed in the above-mentioned Broadwell application Serial No. 190,106, a pressure failure in the air conduit system connected to a pair of units will not result in a destruction of the folded rolling seals of the units upon continued operation, because the units will move into their inoperative position in which case no movement between the parts to which the folded rolling seal ends are connected will take place. However, the units will still be effective to perform their functions as shock absorbers. Moreover, when the units are used in such a system, failure in the air chamber of one unit will not result in the failure of the other unit even though the pressure in the air chamber of the other unit is reduced to atmospheric pressure.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A self-damping suspension unit adapted to be connected between a sprung mass and an unsprung mass comprising a shock absorber including a cylinder part, means adjacent one end of said cylinder part for connecting the same with one of the masses, a piston rod reciprocable longitudinally with respect to said cylinder part having a part thereof extending outwardly from the opposite end of said cylinder part, means on the outer end of said piston rod part for connecting the same to the other of the masses, means defining an air chamber disposed in surrounding relation to said piston rod part when air under pressure is contained therein, means communicating with said air chamber providing for the introduction and exhaust of air under pressure into and out of said air chamber, said air chamber defining means including a folded rolling seal and means mounting said folded rolling seal with respect to said parts for movement from an inoperative position when said air chamber is in communication with the atmosphere wherein said folded rolling seal is operatively connected with one of said parts only to thereby remain inoperable during the relative movement of said parts into an operative position in response to the introduction of air under pressure into said air chamber wherein said folded rolling seal is operatively connected between said parts to provide a seal therebetween during their relative movement, said mounting means including annular seal means longitudinally slidably engaging said piston rod part for movement between opposite end portions of said piston rod part to retain air under pressure within said air chamber in response to the movement of said folded rolling seal from said inoperative position into said operative position.

2. A self-damping suspension unit comprising a shock absorber adapted to be connected between a sprung mass and an unsprung mass, said shock absorber including a cylinder part and a piston rod part extending outwardly from one end of said cylinder part and reciprocal longitudinally with respect thereto in response to the movement of the sprung and unsprung masses toward and away from each other, and means defining an air chamber, means communicating with said air chamber providing for the introduction and exhaust of air under pressure into and out of said air chamber, said air chamber defining means including a folded rolling seal of flexible material, means for fixedly securing one end of said folded rolling seal with respect to one of said shock absorber parts, a member fixed to the opposite end of said folded rolling seal and means mounting said member for movement relative to the other of said shock absorber parts from an inoperative position when said air chamber is exhausted to atmosphere wherein said member and said folded rolling seal are free from relative movement with respect to said one shock absorber part in response to relative reciprocable movement between said parts into an operative position in response to the introduction of air under pressure into said air chamber wherein said member is movable with said other shock absorber part relative to said one shock absorber part to vary the volume of said air chamber in response to the reciprocable movement between said parts, said member including a portion having an aperture formed therein surrounding said piston rod part, said mounting means including an annular seal carried by said member adjacent said aperture slidably sealingly engaging said piston rod part for retaining air under pressure within said air chamber during the movement of said member from said inoperative position to said operative position.

3. A unit as defined in claim 2 wherein said member comprises a tubular element disposed in surrounding generally co-extensive relation to one of said shock absorber parts when disposed in one of said positions and disposed in surrounding generally co-extensive relation to the other of said shock absorber parts when disposed in the other of said positions.

4. A unit as defined in claim 3 wherein said tubular element includes an annular surface receiving one folded portion of said folded rolling seal.

5. A unit as defined in claim 2 wherein said means for fixedly securing one end of said folded rolling seal with respect to one of said shock absorber parts comprises an outer tubular element having an end closure fixed at one end thereof and to the outer end of said piston rod part, said outer tubular element having an interior annular surface receiving one folded portion of said folded rolling seal, said member comprising an inner tubular element having said apertured portion extending inwardly from one end thereof, said inner tubular element having an exterior annular surface receiving another folded portion of said folded rolling seal and extending within said outer tubular element and being disposed in surrounding relation to said cylinder part with said apertured portion adjacent the inner end of said cylinder part when said member is disposed in said operative position.

6. A unit as defined in claim 5 wherein said member mounting means includes a coil spring acting between said cylinder part and said inner tubular element for effecting a relative longitudinal movement of said inner tubular element in a direction to move said apertured portion away from said inner end of said cylinder part and into a position adjacent said end closure when said member is disposed in said inoperative position.

References Cited in the file of this patent

UNITED STATES PATENTS

| | | |
|---|---|---|
| 894,117 | Clark | July 21, 1908 |
| 3,033,554 | Francis | May 8, 1962 |
| 3,046,001 | Schultze | July 24, 1962 |
| 3,063,701 | Long | Nov. 13, 1962 |

FOREIGN PATENTS

| | | |
|---|---|---|
| 143,237 | Great Britain | July 28, 1913 |